US008644964B2

(12) United States Patent
Hendron et al.

(10) Patent No.: US 8,644,964 B2
(45) Date of Patent: Feb. 4, 2014

(54) METHOD AND SYSTEM FOR CONTROLLING MOVEMENT OF AN END EFFECTOR ON A MACHINE

(75) Inventors: Scott S. Hendron, Dubuque, IA (US); Sean P. West, Dubuque, IA (US); James L. Montgomery, Dubuque, IA (US); Eric R. Anderson, Galena, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/463,158

(22) Filed: May 3, 2012

(65) Prior Publication Data

US 2013/0297046 A1 Nov. 7, 2013

(51) Int. Cl.
*G05B 19/18* (2006.01)

(52) U.S. Cl.
USPC .............................................. 700/56; 700/20

(58) Field of Classification Search
USPC ................. 700/19, 20, 28, 56, 57, 59, 64
See application file for complete search history.

(56) References Cited

U.S. PATENT DOCUMENTS

| | | | | |
|---|---|---|---|---|
| 5,380,978 A * | 1/1995 | Pryor | ................... | 219/121.64 |
| 5,469,531 A * | 11/1995 | Faure et al. | .................... | 700/251 |
| 5,706,691 A * | 1/1998 | Okamoto et al. | ................ | 72/237 |
| 5,826,666 A * | 10/1998 | Tozawa et al. | .................... | 172/7 |
| 6,029,959 A * | 2/2000 | Gran et al. | .................... | 267/136 |
| 6,098,322 A * | 8/2000 | Tozawa et al. | .................. | 37/414 |
| 6,147,422 A * | 11/2000 | Delson et al. | .................... | 310/14 |
| 6,307,285 B1 * | 10/2001 | Delson et al. | .................... | 310/14 |
| 6,330,837 B1 * | 12/2001 | Charles et al. | .............. | 74/490.06 |
| 6,841,964 B2 * | 1/2005 | Osuka et al. | ............. | 318/568.21 |
| 6,940,582 B1 * | 9/2005 | Tanaka | ............................. | 355/53 |
| 7,356,937 B2 * | 4/2008 | Nishibashi et al. | ............. | 33/502 |
| 7,386,408 B2 * | 6/2008 | Nishibashi et al. | ............. | 702/94 |
| 7,466,099 B2 * | 12/2008 | McCoy, Jr. | ................. | 318/568.1 |
| 7,474,296 B2 * | 1/2009 | Obermeyer et al. | .......... | 345/156 |
| 7,874,825 B2 | 1/2011 | Khoshnevis | | |
| 8,065,060 B2 * | 11/2011 | Danko | ........................... | 701/50 |
| 8,091,243 B2 * | 1/2012 | Bos | ............................... | 33/1 M |
| 8,355,815 B2 * | 1/2013 | Luce et al. | .................... | 700/245 |
| 2003/0005786 A1 * | 1/2003 | Stuart et al. | ................ | 74/479.01 |
| 2003/0197482 A1 * | 10/2003 | Osuka et al. | ............. | 318/568.21 |
| 2006/0196062 A1 * | 9/2006 | Nishibashi et al. | ............. | 33/502 |
| 2007/0138374 A1 * | 6/2007 | Nishibashi et al. | ........ | 250/208.1 |

(Continued)

OTHER PUBLICATIONS

Alter, Lloyd, Computer Lays the Prettiest Brick Walls Since Aladio Dieste, Article [online], [retrieved Aug. 27, 2012], Retrieved from the Internet <URL: http://www.treehugger.com/green-architecture/computer-lays-the-prettiest-brick-walls-since-eladio-dieste.html>.

(Continued)

*Primary Examiner* — Charles Kasenge
(74) *Attorney, Agent, or Firm* — Stephen F. Rost; Taft, Stettinius & Hollister LLP

(57) ABSTRACT

The present disclosure provides a method of controlling movement of a reference point on an end effector of a machine, where the machine includes a controller, a first control mechanism, and a second control mechanism. The method includes initiating a movement of the reference point to a desired location with the first control mechanism. The method also includes determining an actual position of the reference point and communicating the actual position of the reference point to the controller. A second control mechanism controls the movement of the reference point to the desired location.

20 Claims, 7 Drawing Sheets

(56) References Cited

U.S. PATENT DOCUMENTS

| | | | |
|---|---|---|---|
| 2007/0156019 A1* | 7/2007 | Larkin et al. | 600/104 |
| 2007/0168100 A1* | 7/2007 | Danko | 701/50 |
| 2009/0168961 A1* | 7/2009 | Hieronimi et al. | 378/65 |
| 2010/0204824 A1* | 8/2010 | Luce et al. | 700/219 |

OTHER PUBLICATIONS

Hayon, Jaime, Dezeen, On the Bri(n)ck at Graduate School of Design, Harvard University, Article [online], [retrieved Aug. 27, 2012], Retrieved from the Internet <URL:http://www.dezeen.com/2009/05/11/on-the-brinck-at-graduate-school-of-design-harvard-university/>.

Deyle, Travis, Hizook, High-Speed Robot Hand Demonstrates Dexterity and Skillful Manipulation, Article [online], [retrieved Aug. 27, 2012], Retrieved from the Internet <URL:http://www.hizook.com/blog/2009/08/03/high-speed-robot-hand-demonstrates-dexterity-and-sckillful-manipulation/>.

* cited by examiner

METHOD AND SYSTEM FOR CONTROLLING MOVEMENT OF AN END EFFECTOR ON A MACHINE

FIELD OF THE INVENTION

The present disclosure relates to a control system, and in particular to a control system for providing high accuracy and precision controlled movement of an end effector on a machine.

BACKGROUND OF THE INVENTION

Machine productivity, particularly those performing tasks at a construction or forestry worksite, requires accurate operator control of the machine's work implement. This includes the position and trajectory of the work implement while performing an operation. Many conventional machines utilize automation to control the movement of the work implement in the X, Y, and Z directions. In other words, certain applications may augment operator inputs with automation and closed loop controls.

Conventional construction and forestry machine systems, such as a grade control for a bulldozer or dig depth control for an excavator and backhoe, may only include on-board sensors, such as inclinometers and potentiometers, to establish and control kinematic movement. More recent conventional control systems may use both an on-board and global referencing hardware such as a laser or global-positioning sensor (GPS). In some instances, these systems can provide sufficient precision, e.g., within a few inches, to perform a task. However, there are several factors that limit the accuracy and precision of position, trajectory, velocity, etc. of these systems such as joint wear, sensor accuracy and resolution, sensor mounting tolerances, oil compression, static and dynamic structural deflection, linkage dimensional tolerances, loss of line-of-sight with a global reference device, soil or supporting material deformation, and large-scale machine movement (e.g., during transport or repositioning).

Therefore, it would be desirable to provide a method and control system to achieve greater accuracy and precision of movement of an end effector or work implement coupled to a machine. It is further desirable to provide such a method and control system that can overcome or reduce the effects of the factors noted above that limit the accuracy and precision of conventional control systems. In addition, it would be desirable for a machine to be able to achieve digital or offline programmability and accuracy in order to perform functions typically reserved for high precision robots and rigid gantry cranes.

SUMMARY

In an exemplary embodiment of the present disclosure, a method is provided for controlling movement of a reference point on an end effector of a machine. The machine includes a controller, a first control mechanism, and a second control mechanism. The method includes initiating a movement of the reference point to a desired location with the first control mechanism. The method also includes determining an actual position of the reference point and communicating the actual position of the reference point to the controller. A second control mechanism controls the movement of the reference point to the desired location.

In one aspect, the method can include controlling the first control mechanism independently of the second control mechanism. Here, the second control mechanism can be more accurately controlled than the first control mechanism. In another aspect, the method can include determining the actual position of the reference point with a total station or optical system. Alternatively, the method can include computervision techniques.

In a further aspect of this embodiment, the method includes detecting a difference between the actual location and desired location and controllably maneuvering the second control mechanism about at least one degree of freedom to move the reference point to the desired location. The process of controllably maneuvering can include controlling at least one of a plurality of electric or hydraulic cylinders of the second control mechanism. In a different aspect, the initiating step of the method can include controlling one or more hydraulic or electric cylinders of the first control mechanism. The method can also include storing a position of the first control mechanism and second control mechanism and indexing the reference point in the desired position based on the stored position.

In another embodiment of the present disclosure, a work machine includes a controller and an end effector controllably coupled to the controller. The end effector includes a reference point corresponding to a location on the end effector. The machine also includes a first control system and a second control system controllably coupled to the controller. The first control system is configured to move the reference point towards a desired location and the second control system is controllably isolated from the first control system. The machine further includes a mechanism disposed in communication with the controller in which the mechanism is configured to determine an actual location of the reference point. A difference between the actual location and desired location is communicated to the controller and the second control system is adapted to move the reference point to the desired location.

In a first aspect of this embodiment, the second control system includes at least one degree of freedom compensation linkage. The linkage can include a Stewart platform or a table being controllably independent from the reference point. In a second aspect, the first control mechanism comprises a boom, a dipper stick, and a plurality of hydraulic or electric cylinders. In another aspect, the controller includes a first controller and a second controller, the first controller controlling the first control system and the second controller controlling the second control system. In a different aspect, the mechanism includes an optical system coupled to the machine where the optical system is structured (e.g., using computervision techniques) to detect a change in texture and image flow to determine the actual location. In addition, the mechanism can include a receiver in electrical communication with the controller and a total station positioned at a distance from the reference point, the total station being in wireless communication with the receiver.

A different embodiment of the present disclosure can include a work machine having a controller and an end effector including a reference point, the reference point being controllably positioned by the controller. The machine includes a first closed loop control system controllably coupled to the controller and a second closed loop control system controllably coupled to the controller, where the second closed loop control system is controllably isolated from the first closed loop control system. A position locator is disposed in communication with the controller. In this embodiment, the first closed loop control system is adapted to position the reference point in a desired location, the position locator is adapted to determine an actual location of the reference point, and the controller is adapted to detect a difference between the actual location and desired location. Also, the second closed loop control system is structured to position the reference point from the actual location to the desired location.

In one aspect, the second closed loop control system comprises at least one degree of freedom linkage configured to provide precise controllability. The linkage may also be capable of achieving at least six degrees of freedom. In another aspect, the position locator comprises a total station or optical system. The system can also include a compensation system in the form of one or more accelerometers or inclinometers based on an anti-vibration/motion isolation system.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
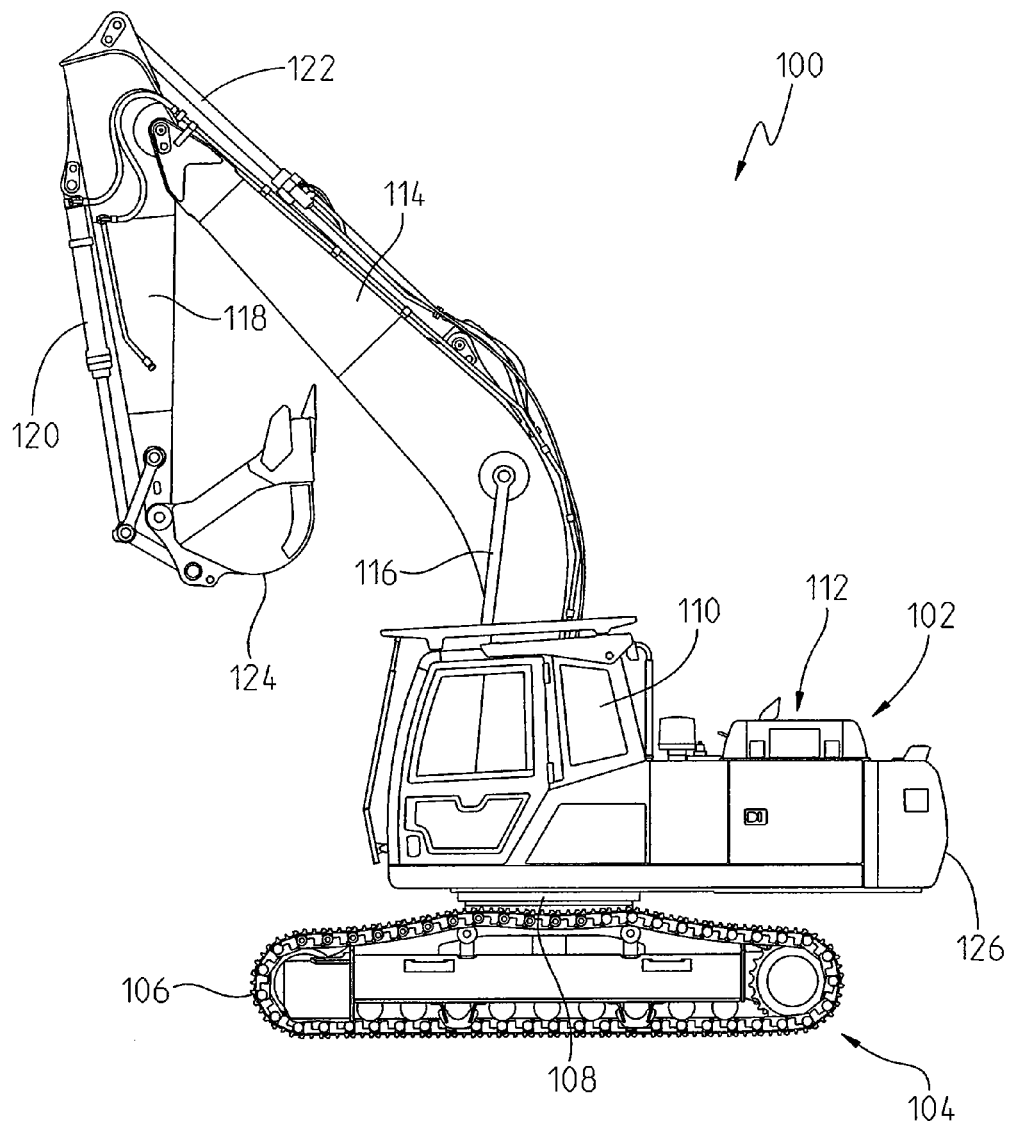
FIG. 1 is a side view of an excavator.

An exemplary embodiment of a work machine is shown in FIG. 1. The machine is embodied as an excavator 100 having an end effector capable of four degrees of freedom. The present disclosure is not limited, however, to an excavator and may extend to other work machines. Referring to FIG. 1, the excavator 100 includes an upper frame 102 pivotally mounted to an undercarriage 104. The upper frame 102 can be pivotally mounted on the undercarriage 104 by means of a swing pivot 108. The upper frame 102 is rotatable about 360° relative to the undercarriage 104 on the swing pivot 108. A hydraulic motor (not shown) can drive a gear train (not shown) for pivoting the upper frame 102 about the swing pivot 108.

The undercarriage 104 can include a pair of ground-engaging tracks 106 on opposite sides of the undercarriage 104 for moving along the ground. Alternatively, the excavator 100 can include wheels for engaging the ground. The upper frame 102 includes a cab 110 in which the machine operator controls the machine. The cab 110 can include a control system (not shown) including, but not limited to, a steering wheel, a control level, control pedals, or control buttons. The operator can actuate one or more controls of the control system for purposes of operating the excavator 100.

The excavator 100 also includes a large boom 114 that extends from the upper frame 102 adjacent to the cab 110. The boom 114 is rotatable about a vertical arc by actuation of a pair of boom cylinders 116. A dipper stick or arm 118 is rotatably mounted at one end of the boom 114 and its position is controlled by a cylinder 122. The opposite end of the boom 114 is coupled to the upper frame 102. At the end opposite the boom 114, the dipper stick or arm 118 is mounted to an end effector in the form of an excavator bucket 124 that is pivotable relative to the arm 118 by means of a cylinder 120. Cylinders 116, 120, and 122 can be electric or hydraulic cylinders.

The upper frame 102 of the excavator 100 includes an outer shell cover to protect an engine assembly 112. At an end opposite the cab 110, the upper frame 102 includes a counterweight body 126. The counterweight 126 comprises a housing filled with material to add weight to the machine and offset a load collected in the bucket 124. The offset weight can improve the digging performance of the excavator 100.

Although FIG. 1 illustrates an excavator, the present disclosure is applicable to other machines besides an excavator and can include any machine having an end effector which is controlled by one or more inputs (or degrees of freedom) from the operator. As such, the term "machine" will be used instead of excavator for purposes of this disclosure.

Figure 2:
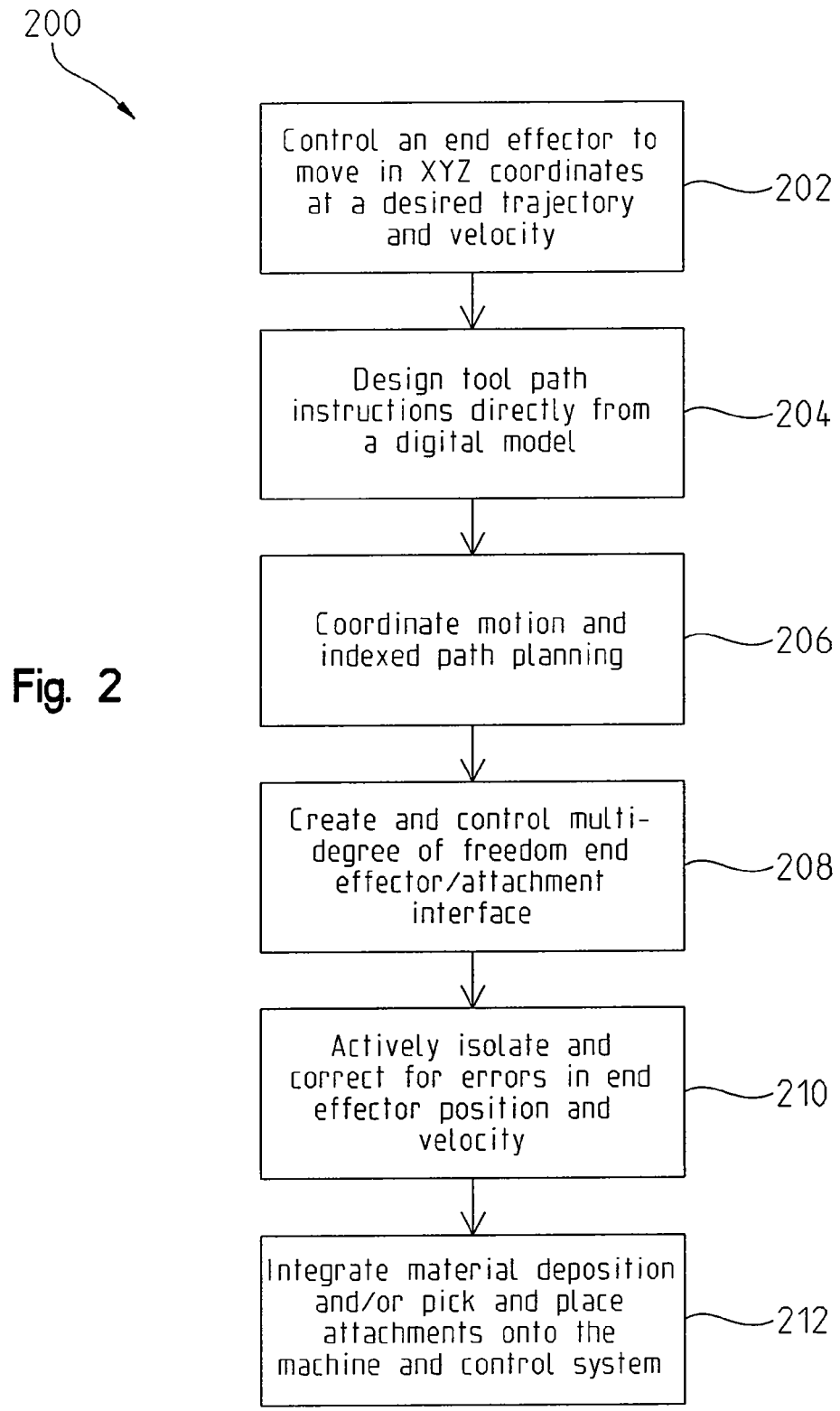
FIG. 2 is a flow diagram of a three-dimensional control process for a machine.

There have been technological developments in the effort to achieve high accuracy three-dimensional movement and control of machines. Referring to FIG. 2, a diagram 200 illustrates some of the advances in technology from conventional systems to what is provided in the present disclosure. In block 202, for instance, the position, trajectory and velocity of an end effector can be controlled through three-dimensional control (e.g., in the X, Y, and Z directions or "XYZ control"). For instance, the linkage or pin that couples the boom 114 and dipper stick 118 to one another can be controlled through manual XYZ control, and in particular the velocity and position thereof, by a joystick or controller in the operator's cab 110. Other controls, such as a steering wheel, buttons, levers, and pedals, can be used for manual control of a machine.

In block 204, automatic three-dimensional control of a machine system can be achieved by building or designing tool path instructions directly from a digital model (e.g., CAD to machine programming). One such way has been through file-path planning. Three-dimensional printing, or additive manufacturing, is a process of making three-dimensional solid objects from a digital file. Three-dimensional printing can be achieved using additive processes, where an object is created by laying down successive layers of material. The use of additive manufacturing can take a virtual design, for example, from a computer-aided design (CAD) or animation modelling software. These virtual designs can then be transformed into thin, virtual, horizontal cross-sections and used to form successive layers until the model is completed. The standard data interface between CAD software and a machine is a .stl file format. A .stl file format can approximate the shape of a part or assembly using triangular facets, whereas smaller facets can produce a higher quality surface. VRML (or WRL) files are often used as an input for three-dimensional printing technologies that are able to print in color.

Similar to three-dimensional printing, machine control can be achieved through robotic path planning. An instruction or command can be created in a form of code to move a machine from a first position to a second position. From this technology, three-dimensional motion can be achieved by following a defined path. In the three-dimensional CAD printing system, a model can be formed using Pro/Engineering software and a .stl file is created. From the .stl file, certain machine control can be achieved.

As a result, coordinated motion and indexed path planning can be achieved in block 206. Here, the ability to spatially index a machine position and continue automatic three-dimensional control based on block 204 is achieved. In other words, if a linkage on a machine moves along a defined path from a first location to a second location, and then the machine travels a distance to a new area, the machine can be indexed so that the linkage is positioned in the first location and is controlled along the defined path to the second location. This ability to index the machine to a defined location based on a previous operation is achieved through block 206.

Figure 4:
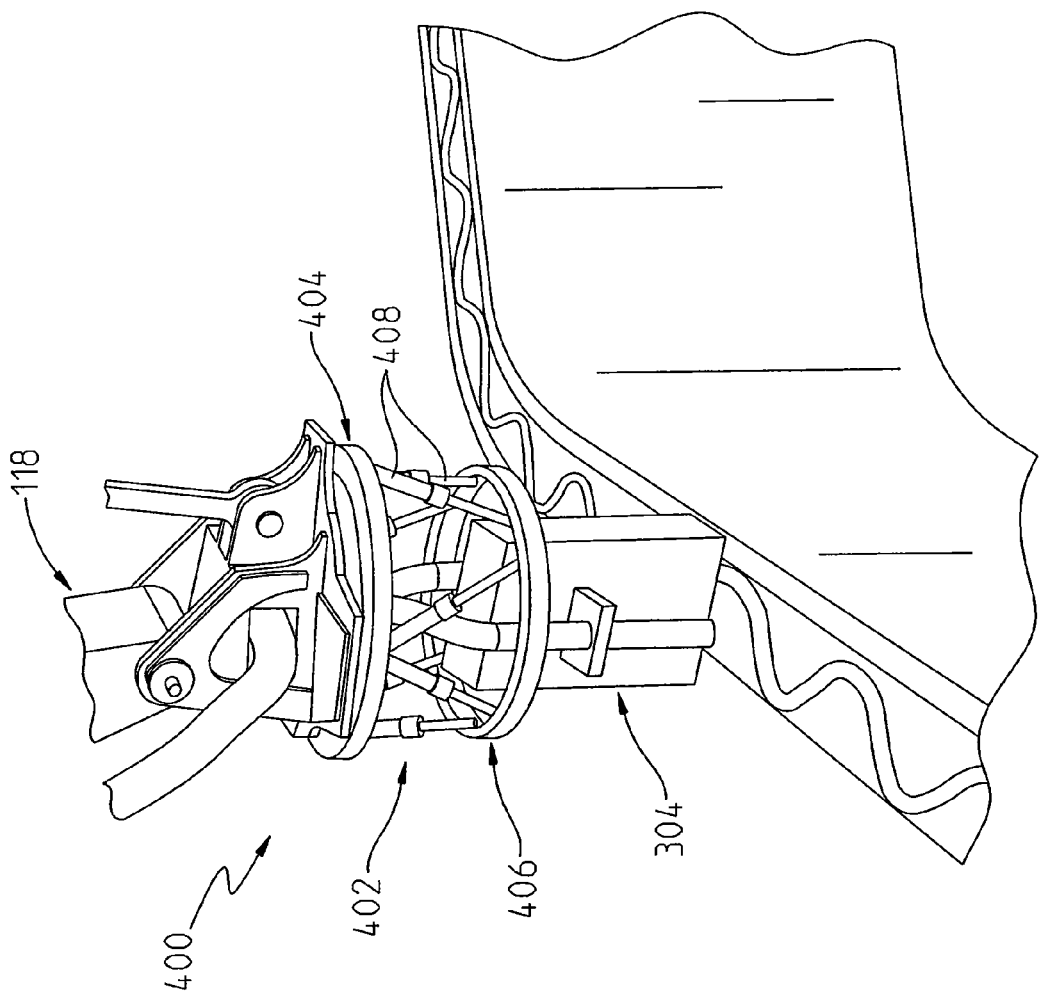
FIG. 4 is an embodiment of a six-degrees of freedom control linkage.

Referring to block 208, an at least one degree of freedom end effector linkage has been developed in the form of a Stewart platform. A Stewart platform is a type of parallel robot that incorporates six prismatic actuators, e.g., hydraulic cylinders. The platform can also be referred to as a hexapod due to the number of cylinders. The cylinders can be electric or hydraulic depending on the application. An example of a Stewart platform 400 is shown in FIG. 4. The cylinders 408 are mounted in pairs to the platform base 404, crossing over to three mounting locations on a platform table 406. A device, such as an end effector, disposed on or coupled to the table 406 can be moved in at least one degree of freedom. In the present disclosure, the Stewart platform 400 will be shown and referred to in most embodiments as the at least one degree of freedom linkage. However, other similar platforms are contemplated in this disclosure.

Figure 3:
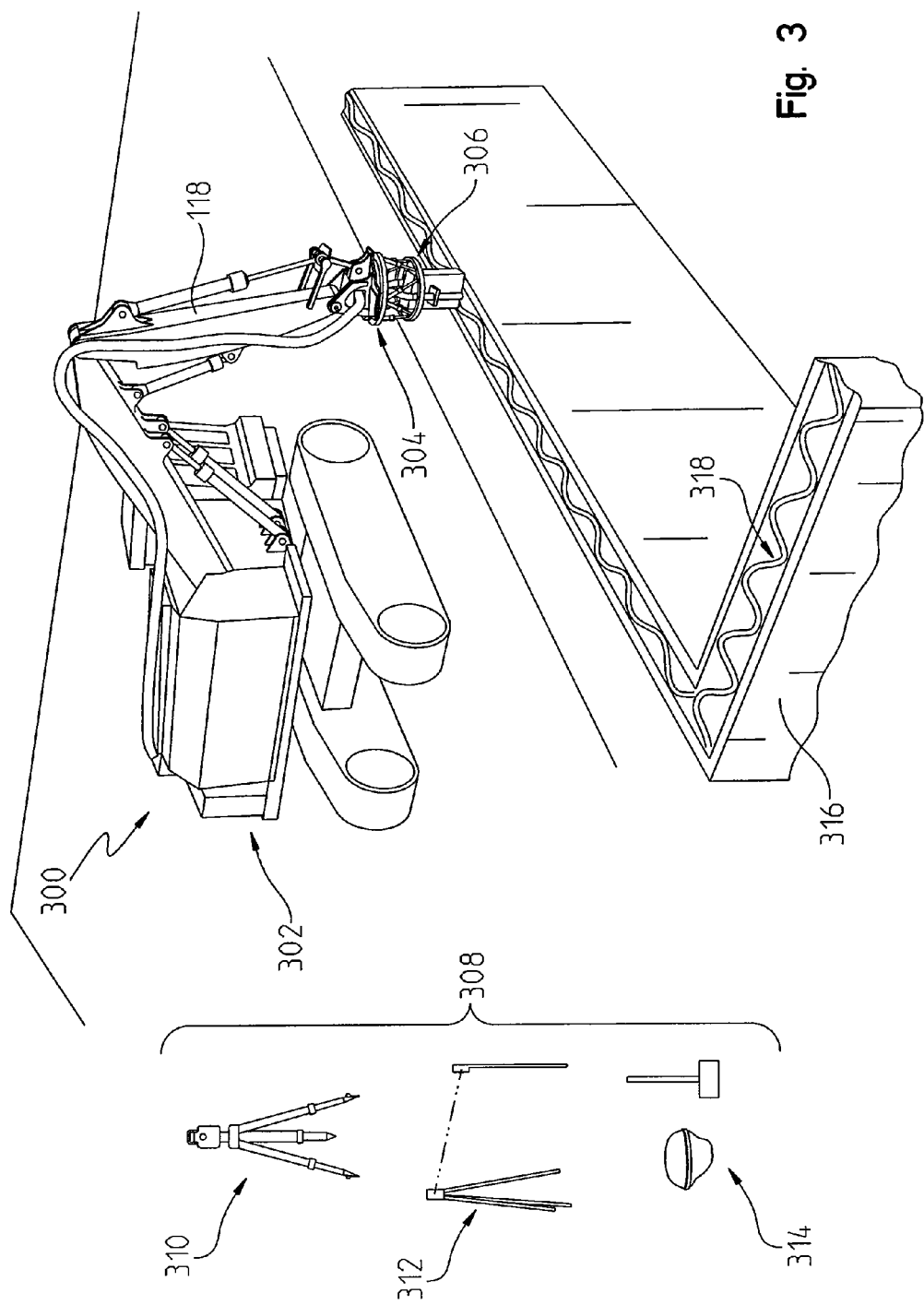
FIG. 3 is an exemplary three-dimensional control system coupled to a machine.

In block 210, a motion isolation system is used for stabilization and high accuracy control of the at least one degree of freedom linkage developed in block 208. An example of this system is shown in the embodiment of FIG. 3. To achieve high precision, a control system 300 for a machine 302 is illustrated. The machine 302, which can be an excavator 100 similar to the one in FIG. 1, can include a boom 114 coupled to an upper frame 102 and a dipper stick 118 pivotably coupled to the boom 114. An end effector 304, such as a material dispenser, can be controllably coupled to the upper portion of a motion isolation platform such as a Stewart platform 400 which takes the place typically reserved for a bucket on an excavator. Similar to the embodiment of FIG. 4, a three-dimensional control mechanism 306 capable of achieving at least one degree of freedom can be coupled between the dipper stick 118 and end effector 304. The mechanism 306, or at least one degree of freedom linkage, can precisely control the operation of the end effector 304. To do so, a stationary reference device 308 is provided as part of the control system 300. The stationary reference device 308 can be in the form of a total station 310, a laser grade control 312, or global positioning sensor with real time kinematic (RTK) functionality (or on board method such as an accelerometer, etc).

In FIG. 3, the end effector 304 is provided in the form of a material dispenser. Here, a concrete pattern 318 is being formed along a path 316 through the precise control of the three-dimensional control mechanism 306 in collaboration with one or more of the stationary reference devices 308. It is noted that while only three such devices are shown in FIG. 3, these are only provided as examples and the present disclosure can include any stationary reference device as will be explained in further detail with reference to FIGS. 5-7. Another compensation control loop can also be included whereby one or more accelerometers or inclinometers are coupled to the Stewart platform 400 such that feedback from one of the stationary reference devices 308 and the other compensation control loop can achieve high precision control of the end effector.

Referring to block 212 of the method 200, the motion isolation system of block 210 is capable of being integrated with a material deposition or a pick and place system. An example of this is shown in the embodiment of FIG. 3 where the end effector 304 is depositing concrete material along a pattern 318. One of the advantages of this system is the integration of the at least one degree of freedom linkage, e.g., Stewart platform 400, with a mobile machine such as an excavator. Other vehicles can also be used, particularly construction and forestry machinery.

As described, the present disclosure provides a mechanism to be coupled between a dipper stick and end effector to achieve precise control unparalleled by other control systems. The present disclosure further includes a closed loop control system for controlling the movement of the end effector to compensate for error in the conventional control system of the machine, e.g., the control of the electric or hydraulic cylinders 116, 120, 122 of FIG. 1. In doing so, tighter tolerances can be achieved with a mobile machine that is not capable with the conventional control system.

With this control system, the machine can have one or two closed loop control systems. The two systems are isolated from one another and can be controlled independently of one another. The first system is configured at the back end of an excavator, backhoe, harvester, etc. The second system, which is independent of the first system, is provided in the form of the at least one degree of freedom linkage such as the Stewart platform 400. The first system can be controlled by a first control system, which is conventional for most machines. The second system, however, is controlled by a second control system which is isolated and, in some instances, independent of the first control system. This will be explained in the following embodiments.

Figure 5:
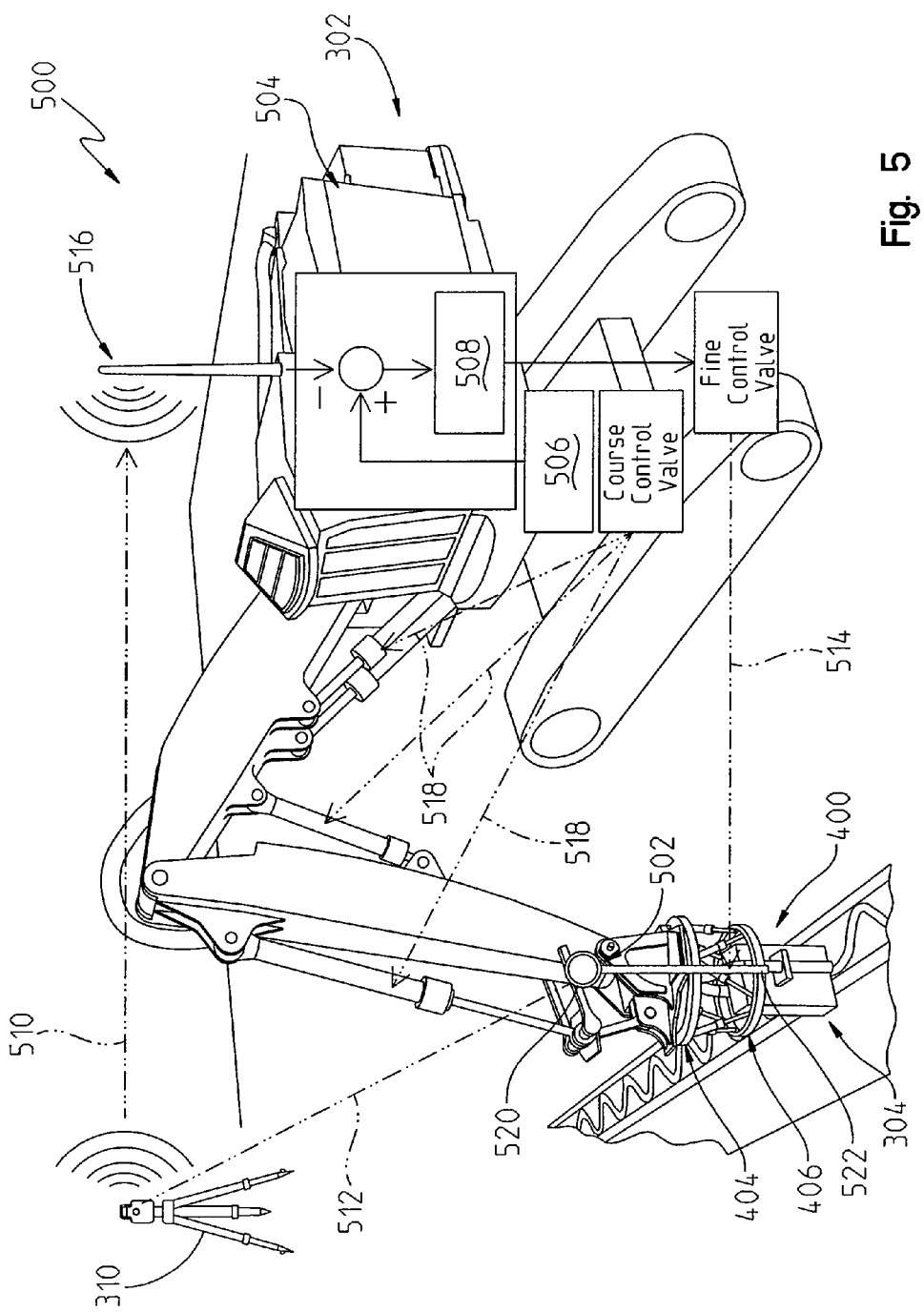
FIG. 5 is a first embodiment of a three-dimensional control system.

Referring to FIG. 5, an exemplary embodiment of a high precision three-dimensional control system 500 is provided for a mobile machine. In this embodiment, a stationary reference device 308 in the form of a total station 310 is included in the control system 500. A total station 310 is a known device used in surveying for tracking the position of a reference point. In FIG. 5, a reflector 520 is disposed on the machine at a reference point 502 and the total station 310 can provide a precise location or position of the reference point 502. In particular, the total station 310 is able to track the reference point 502 by emitting and receiving light to and from the reflector. The time of flight from emission and receipt (and total station head rotation and azimuth) is used to determine the distance of the reflector 520 to extreme accuracy. The total station 310 can rotate about an axis to follow movement of the reflector 520, and through distance and angle calculations, the global position of the reference point 502 is known. In addition to the total station, one or more accelerometers or inclinometers can be coupled to points on the at least one degree of freedom linkage so that at least three points of reference are being tracked. The accelerometers or inclinometers form a compensation system. The determined position can then be communicated to a machine controller to achieve precise control of an end effector.

In the embodiment of FIG. 5, the machine 302 can include a main controller (not shown). The main controller can control the different functionality and operation of the machine through software or algorithm programs. The main controller can be commanded, based on a software or algorithm step, to move an upper pivot along a defined path. The upper pivot can be any point defined along the dipper stick or boom of the machine 302. This upper pivot may also be the reference point 502. Thus, referring to FIGS. 4 and 5, the position of the platform 404 is capable of being controlled with a first control loop and the table 406 is controlled with the second control loop (which can include a compensation system).

When the machine 302 moves the reference point 502 about the defined path, vibration and other factors can alter or affect the path of movement of the reference point 502. In other words, the reference point 502 may move in a general direction of the defined path, but there can be slight error in the movement of the reference point 502. To compensate for this error, the reflector 520 on the machine 302 can be observed relative to ground by the total station 310. The total station 310 is capable of detecting the exact location of the reference point 502 via the location of the reflector 520 by receiving a light signal 512 from the reflector 520. In addition or alternatively, the position of an accelerometer 522 coupled to the table 406 can be tracked and communicated to a machine controller. An angular velocity sensor may also be used to track position, trajectory, and velocity of the table 406. The total station 310 can communicate position or location via a signal 510 to the machine controller (not shown). The machine controller can be electrically coupled to an antenna 516 disposed on the machine 302. The signal can be transmitted wirelessly from the total station 310 or by other known means.

The signal 510 transmitted by the total station 310 can be used by the controller to communicate with the Stewart platform 400. A return signal 514 from the controller to the Stewart platform 400 can operably control one or more of the cylinders or actuators of the linkage to move the end effector. The amount of movement can depend on the actual location of the reference point 502 compared to its intended or desired location. As a result, the control of the Stewart platform or any at least one degree of freedom linkage can compensate for error in the original instruction and provide precise control, movement, and velocity of the end effector 304.

The Stewart platform 400 can provide advantages in the illustrated embodiments. The platform 400 is an at least one degree of freedom linkage, and in some embodiments a six degrees of freedom motion platform, that is capable of controlling movement extremely accurately. As previously described, this embodiment includes two closed loop control systems, or alternatively may only comprise a single control loop system including a total station and a compensation system (e.g., a two-axis inclinometer). In FIG. 5, the first closed loop control system includes the machine controller. The machine controller can be referred to as a coarse controller 506. The machine controller can also include a fine controller 508. In other words, the main controller can include both coarse control 506 and fine control 508. Alternatively, there can be two controllers, a coarse controller 506 and a fine controller 508. From hereinafter, the coarse controller 506 is the first controller and the fine controller 508 is the second controller.

The first controller 506 can command the end effector to move to a desired position. This can be done by actually monitoring or instructing a reference point 502 to move to a desired position. To move the reference point 502, the first controller 506 can control the electric or hydraulic cylinders for moving the boom and dipper stick. A signal 518 can be communicated to the cause the cylinders to extend or retract for purposes of moving the reference point 502. However, due to deflection, vibration, or other factors, the reference point 502 may not reach the desired position. In FIG. 5, the total station 310 can detect the exact location of the reference point 502 by emitting and receiving a light signal 512 from the reflector 520. As previously described, the total station 310 can communicate with the controller by sending a signal 510 to the antenna 516 which is in communication with the first controller 506.

Once the first controller 506 interprets the signal 510, and in particular the actual location of the reference point 502, the second controller 508 can determine if the actual location or position corresponds to the desired position. In the event there is a difference between the actual position and desired position, the second controller 508 can determine how to move the reference point 502 to the desired position. The second controller 508 can then control the movement of the reference point 502 by sending a signal 514 to the Stewart platform 400 (or any six degrees of freedom motion linkage). The signal 514 can include instructions for moving the one or more cylinders of the platform 400 to achieve the desired position. In doing so, precise control and movement of the end effector 304 is possible with the control system 500 of FIG. 5.

Figure 6:
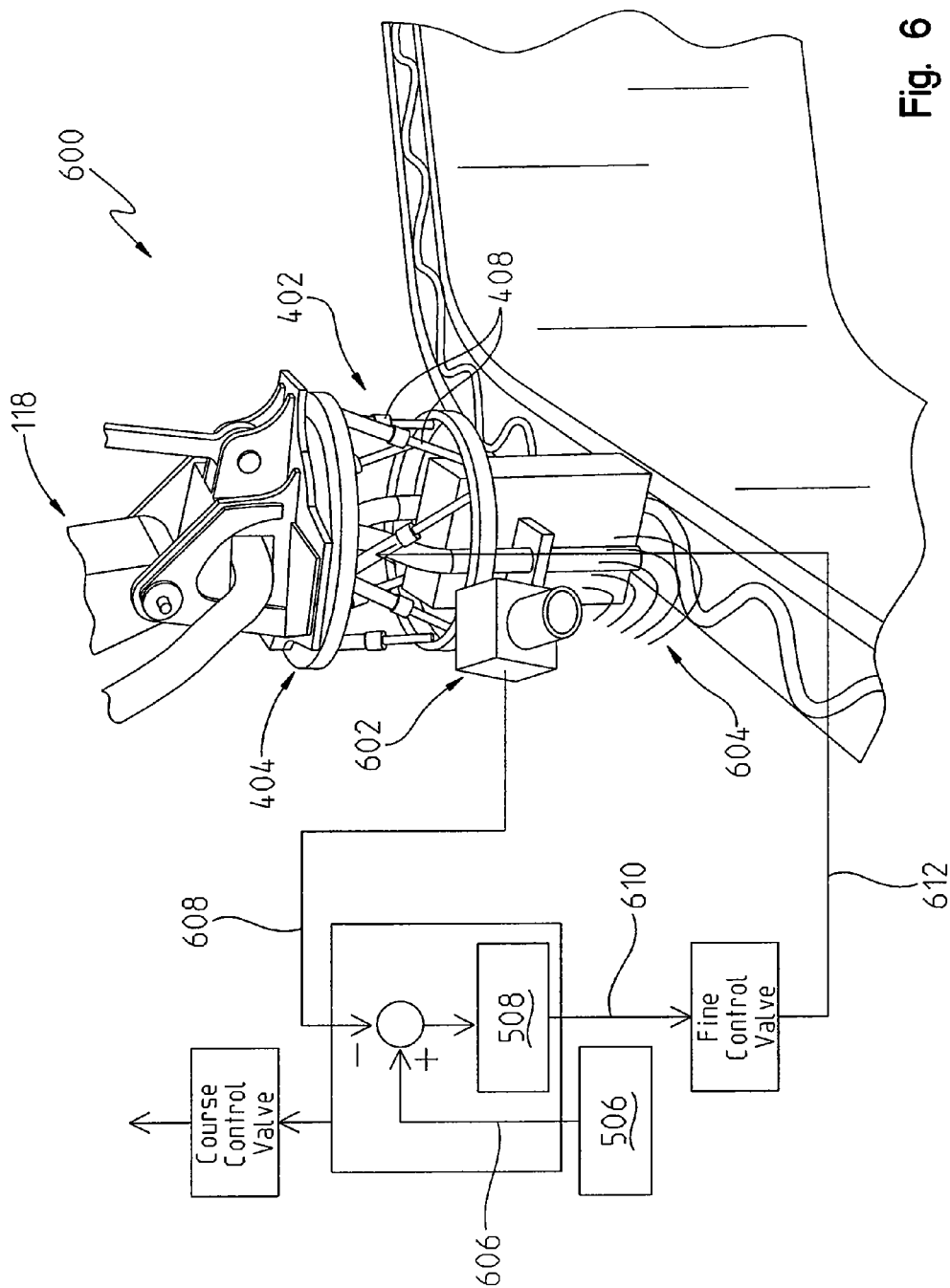
FIG. 6 is a second embodiment of a three-dimensional control system.

Another embodiment of a control system 600 is shown in FIG. 6. Here, an optical system 602 is provided to detect surface pattern similar to computervision technology. For example, a camera can be part of the optical system 602 and illuminate the ground. The camera can detect a change in pattern or image flow (e.g., pixels) and determine a speed at which the camera is moving. The camera can be positioned at the reference point. By detecting a change in texture and image flow, the movement of the camera can be localized and gain a sense of what the camera is doing (e.g., its actual position, velocity, trajectory, etc.).

In FIG. 6, if the end effector 304 is depositing material along a defined path, the speed, position, and trajectory of the end effector 304 can be controlled by monitoring the optical system 602. If the optical system 602 is moving too slow, the end effector 304 may deposit too much concrete. Alternatively, if the optical system 602 is moving too fast, the end effector 304 may deposit too thin of a layer of concrete. Therefore, the position, speed, and trajectory (e.g., path) of the optical system 602 can be desirably measured by the control system 600. For comparison sake, the optical system 602 can function similar to an optical mouse used with a computer.

In this control system 600, the machine 302 can include a boom, dipper stick 118, end effector 304 and house (swing/turntable) which are controlled by electric or hydraulic cylinders. A first controller 506 can communicate with the cylinders to controllably move the end effector to a desired location and at a desirable speed and trajectory. To do so, the first controller 506 sends a signal 606 command to move the cylinders. As the cylinders move the end effector 304, the optical system 602 moves correspondingly with the end effector 304. As the optical system 602 moves, a pattern or image flow signal 604 detects a change in texture and image flow. As such, the optical system 602 communicates this information by sending a signal 608 to the second controller 508. The second controller 508 can interpret this signal 608 and determine the actual position, speed or trajectory of the end effector 304. If the actual position, speed, or trajectory does not correspond with the desired position, speed, or trajectory, the second controller 508 can send a control command signal 610, 612 to the Stewart platform 400 to achieve precise movement of the cylinders 408. The Stewart platform 400 can precisely control the position, speed, or trajectory of the end effector to achieve the desired position, speed, or trajectory thereof. The embodiments of FIGS. 5 and 6 are only two examples of a global coordinate system-based control system. Other systems can achieve similar control aspects.

Figure 7:
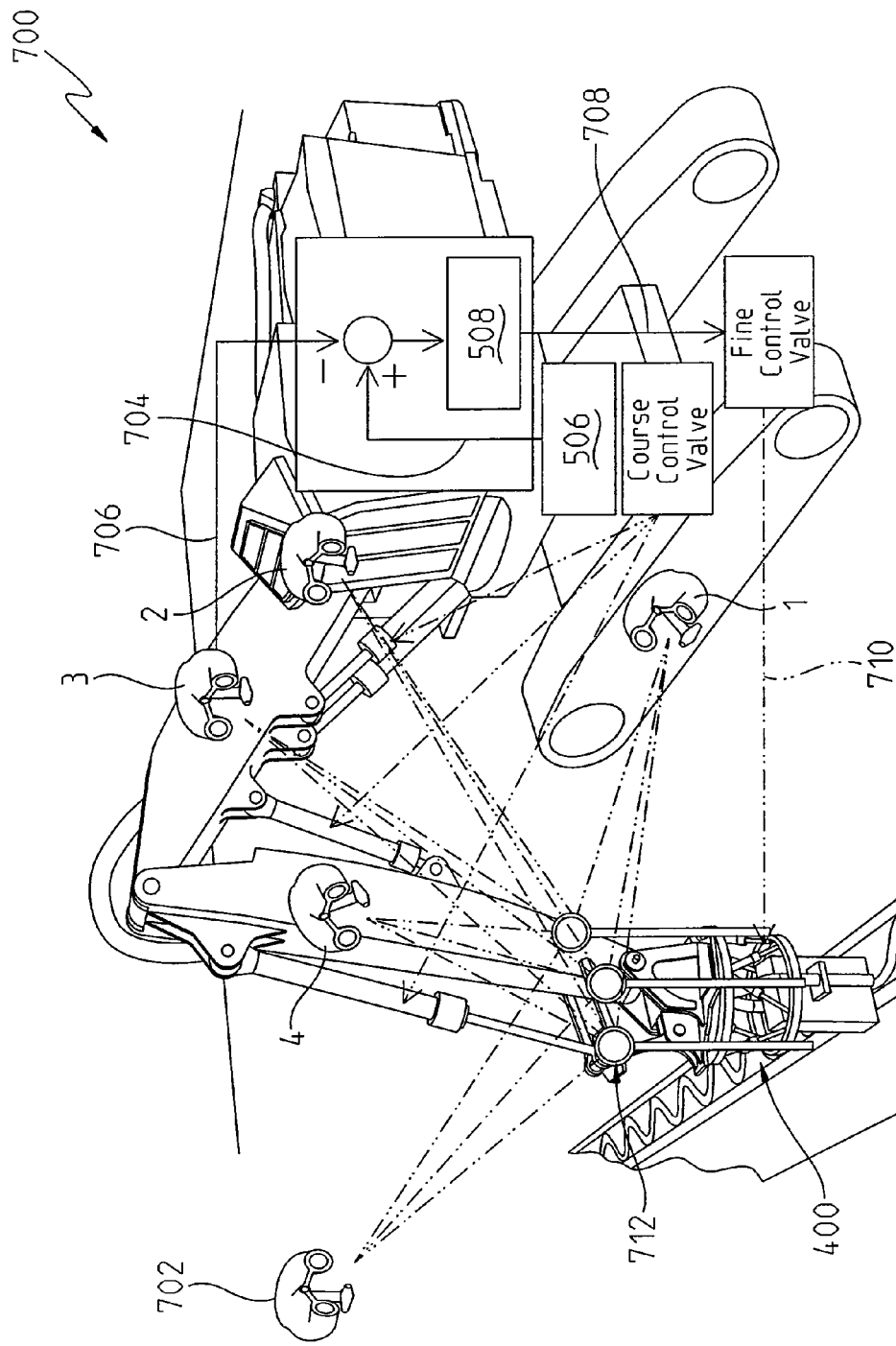
FIG. 7 is a third embodiment of a three-dimensional control system.

Referring to FIG. 7, a different embodiment of a control system 700 is shown. The control system 700 can determine the true global location of an end effector 304. In this embodiment, a three-dimensional scanning device such as a binocular camera can be used to calculate the three-dimensional position of objects in space relative to a reference point. This information can be compared with a desired position, trajectory, velocity, etc. and a fine motion controller can then compensate for error by controlling an at least one degree of freedom linkage such as the Stewart platform 400. In FIG. 7, there can be five separate frames of reference for locating a binocular camera or three-dimensional scanner system. These five can be coupled to the 1) machine chassis, 2) cab or upper frame housing, 3) boom, 4) arm or dipper stick, and 5) ground.

The control system 700 can include three or more reflective devices 712 mounted at each of the pair of cylinders adjacent to the dipper stick and one reference location. During operation, a command signal 704 can be sent from the first controller 506 to control the movement of the cylinders. The cylinders can expand or retract to move the end effector 304 to a desired position, speed, trajectory, etc. The one or more three-dimensional scanner devices 702 can detect the actual position of the end effector 304 by observing the movement of the reflectors 712. Signals emitted and received between the devices 702 and reflectors 712 can be used for determining the actual position. A signal 706 containing the actual position of the end effector can then be communicated to the second controller 508. The second controller 508 can command a signal 708 to a control valve which in turn commands a signal 710 to the Stewart platform 400. The cylinders or actuators 408 of the Stewart platform 400 precisely control the movement of the end effector to the desired position, speed, trajectory, etc.

Other control systems may include accelerometers, inclinometers, global positioning sensors or other alternative devices in combination with an at least one degree of freedom control linkage to achieve precise positioning and control of an end effector. Some systems may be capable of precisely controlling position, speed, and trajectory of the end effector. Other systems may only be able to control position, speed, or trajectory.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A work machine, comprising:
a controller;
an end effector controllably coupled to the controller, the end effector including a reference point corresponding to a location on the end effector;
a first control system controllably coupled to the controller, the first control system configured to move the reference point towards a desired location, where the first control system comprises a boom, a dipper stick, and a plurality of hydraulic or electronic cylinders;
a second control system controllably coupled to the controller, the second control system being controllably isolated from the first control system; and
a mechanism disposed in communication with the controller, the mechanism configured to determine an actual location of the reference point;
wherein, a difference between the actual location and desired location is communicated to the controller and the second control system is adapted to move the reference point to the desired location.

2. The work machine of claim 1, wherein the second control system comprises a six degrees of freedom linkage.

3. The work machine of claim 2, wherein the linkage comprises a Stewart platform.

4. The work machine of claim 2, wherein the linkage comprises a table being controllably independent from the reference point.

5. The work machine of claim 1, wherein the controller comprises a first controller and a second controller, the first controller controlling the first control system and the second controller controlling the second control system.

6. The work machine of claim 1, wherein the mechanism comprises an optical system coupled to the machine, the optical system structured to detect a change in texture and image flow to determine the actual location.

7. The work machine of claim 1, wherein the mechanism comprises:
a receiver in electrical communication with the controller; and
a total station positioned at a distance from the reference point, the total station being in wireless communication with the receiver.

8. The work machine of claim 1, wherein the second control system comprises a base, a table, and a plurality of actuators coupled between the base and table.

9. The work machine of claim 8, wherein the table is controllably independent of the end effector.

10. The work machine of claim 1, wherein the end effector is coupled directly to the second control system.

11. The work machine of claim 1, wherein the second control system is controllably independent of the end effector.

12. The work machine of claim 1, further comprising:
a chassis coupled to the boom and one of the plurality of hydraulic or electronic cylinders;
a plurality of scanning devices coupled to at least the chassis and the boom;
a first reflector coupled to the one of the plurality of hydraulic or electronic cylinders; and
a second reflector coupled to the reference point of the end effector;
wherein, the plurality of scanning devices is adapted to track a location of each of the first reflector and the second reflector and communicate the location of each reflector to the controller.

13. A work machine, comprising:
a chassis;
a first controller and a second controller;
a boom and hydraulic cylinder coupled to the chassis, the boom and hydraulic cylinder operably controlled by the first controller;
a multi-degree of freedom control apparatus coupled to the boom and hydraulic cylinder and being operably controlled by the second controller, wherein the multi-degree of freedom control apparatus includes a base, a table, and a plurality of actuators coupled between the base and table;
an end effector coupled to the multi-degree of freedom control apparatus, the end effector adapted to be moved to perform a desired function;

a position sensing device disposed in electrical communication with the second controller;

wherein, the first controller operably controls the boom and cylinder to move the end effector to a desired position, the position sensing device is adapted to determine an actual location of the end effector, and the second controller is adapted to detect a difference between the actual location and desired location;

further wherein, the second controller is structured to operably control the multi-degree of freedom control apparatus to move the end effector from the actual location to the desired location.

14. The work machine of claim 13, wherein the multi-degree of freedom control apparatus comprises a six degrees of freedom linkage configured to provide precise controllability.

15. The work machine of claim 13, wherein the position sensing device comprises a total station or optical system.

16. The work machine of claim 13, wherein the table is controllably independent from the end effector.

17. The work machine of claim 13, wherein the end effector is coupled directly to the table.

18. The work machine of claim 13, further comprising:

a cab or upper frame coupled to the chassis;

a dipper stick coupled to the chassis at one end and to the boom at an opposite end thereof;

a plurality of scanning devices coupled to at least the chassis, cab or upper frame, boom, and dipper stick; and a plurality of reflectors coupled to the hydraulic cylinder and at a reference location adjacent to the end effector;

wherein, the plurality of scanning devices is adapted to track a location of each of the plurality of reflectors and communicate the location of each of the plurality of reflectors to the second controller.

19. The work machine of claim 14, wherein the linkage comprises a Stewart platform.

20. The work machine of claim 13, wherein the position sensing device comprises an optical system coupled to the machine, the optical system structured to detect a change in texture and image flow to determine the actual location of the end effector.

* * * * *